Patented Sept. 28, 1954

2,690,393

UNITED STATES PATENT OFFICE 2,690,393

METHOD OF PRODUCING FIRE-RESISTANT INSULATION

Alan R. McGarvey, Lancaster Township, Lancaster County, Pa., assignor to Armstrong Cork Company, Lancaster, Pa., a corporation of Pennsylvania No Drawing. Application June 24, 1950,
Serial No. 170,269

7 Claims. (Cl. 92—21)

This invention relates to a method of producing fire-resistant insulation and is concerned particularly with the manufacture of a mineral fiber insulation in board form which is fire-resistant. The term "mineral wool" will be used to include the various types of inorganic fibers produced from wool-forming ingredients including glass, limestone, and slag.

In the manufacture of mineral wool insulating board, common practice is to combine the mineral wool with paper pulp and asphalt in a water slurry and form the product by a screen or filter process, such as disclosed in Abbott Patent No. 2,481,486. Some mineral wool boards are formed with a phenol-formaldehyde resin binder in place of the paper pulp and asphalt binder referred to. Such products are not fireproof, and there is a demand for such fireproof products. Mineral wool insulating board is frequently uesd in cold storage installations where moisture is encountered, and it is essential, therefore, that the binder also be water-resistant. The asphalt-bound product cannot be successfully rendered fire-resistant at a low cost, but fire-resistance may be imparted to the phenol-formaldehyde resin by adding thereto fireproofing salts. Many of such salts, such as borax, boric acid, diammonium phosphate, and combinations thereof, are water-soluble and tend to leach out of the board in service. In addition, the water-soluble fireproofing salts tend to migrate to the surface of the product during drying and heat curing of the resin. As disclosed in my copending application Serial No. 170,270, filed June 24, 1950, and entitled "Method of Producing Fire-Resistant Inorganic Fiber Insulation," an improved method of making mineral wool insulating board consists of combining a phenol-formaldehyde resin with certain phosphates and heating to a critical temperature between 325° F. to 400° F. One of the problems involved with such compounds is the tendency for the finely precipitated phosphates to be lost in the white water.

An object of this invention is to provide a method of making mineral wool insulation including a water-insoluble fireproofing material which will be substantially completely deposited on the fibers during formation of the product.

Another object of the invention is to provide a method of making fire-resistant mineral wool insulation board with commercially available mineral wool insulation board making equipment.

According to this invention, the mineral fibers have deposited thereon a phenol-formaldehyde binder having incorporated therein during polymerization of the phenol and formaldehyde a phosphate fire-proofing ingredient selected from the group consisting of monocalcium phosphate, tri-aluminum phosphate, and magnesium ammonium phosphate. The binder is preferably deposited upon the fibers from a water slurry.

In the preparation of a typical binder component, phenol is reacted with an excess of formalin in the presence of a catalyst such as ammonium hydroxide. The mixture is refluxed for four to five minutes after it becomes milky in appearance. The upper aqueous layer is decanted from the lower viscous layer while still hot. Ten parts by weight of monocalcium phosphate are added to 40 parts by weight of the viscous resinous material, and the mixture is heated to 90° C. to 100° C. while the monocalcium phosphate is thoroughly mixed with the resin. Polymerization is continued by holding the mixture at 90° C. to 100° C. for about two and one-quarter hours. At the end of such period the resin is such that at ordinary room temperatures of 70° F. to 90° F. it is hard and brittle and it is ground into a powder.

The powdered material is dispersed in water, and to this dispersion are added mineral wool fibers. The formulation for the slurry may be as follows:

| | Per cent |
|---|---|
| Mineral wool fibers | 95 |
| Phenol-formaldehyde resin and phosphate prepared as above | 5 |

The slurry which may contain 90% to 95% of water is deposited in a forming mold of the type disclosed in the Abbott patent referred to above. The formed mat which will contain about 75% of water is then dried and the binder component is cured. Drying may be accomplished first by a low temperature heat treatment, in the order of 250° F., and then curing may be effected at a higher temperature, 280° F., for example. Improved results will be obtained if the invention of my application Serial No. 170,270 referred to above is practiced, and heating of the board is effected at temperatures in the range of 325° F. to 400° F.

The quantity of binder used is not critical; generally about 5% based on the weight of the fiber will be a minimum, and the maximum will be dictated by cost and physical characteristics desired in the final product.

It will be observed during board formation that the resin-phosphate mixture is uniformly distributed over the fibers and does not migrate excessively to the surface of the formed mat upon drying and curing. This material satisfactorily passes the fire-resistance test set forth in Maritime Commission Specification No. 32-MC-1, Section F-3d, dated February 15, 1941.

While the resin may be prepared as described above, other conventional resin-making procedures may be employed as is customary in the preparation of water-dispersible resins capable of being ground for such water dispersion. Preferably, the phosphate is incorporated into the resin after initial polymerization has been effected, although it may be added to the reactants prior to reaction, if desired.

The organic phosphates are not acceptable, and all of the inorganic phosphates do not produce adequate fire-resistance. For instance, tri-magnesium phosphate may be incorporated with a phenol-formaldehyde resin during polymerization but does not produce a satisfactory fireproof mineral wool board.

Monocalcium phosphate is the preferred phosphate because of its low cost. There is a so-called "sugar" grade of monocalcium phosphate which is available at a lower price than the highly refined monocalcium phosphate, and it has been found acceptable. Magnesium ammonium phosphate is more expensive than the monocalcium phosphate, but it is also useful in the practice of the present invention as is tri-aluminum phosphate which is even more expensive than the magnesium ammonium phosphate. The quantity of phosphates incorporated with the resin should be in the range between about 15% and 40%, based on the weight of the resin. Because of the cost of the phosphates, it is preferred to keep the total quantity as low as possible. Twenty-five percent gives very satisfactory results. Where cost is not a controlling factor, higher percentages may be used with good results; and a smaller amount of phosphate may be used to obtain requisite fire-resistance for some uses where cost is a major factor militating against the use of higher quantities. Of course, mixtures of the various phosphates may be used in any and all proportions.

I claim:

1. In a method of producing fire-resistant insulation, the steps comprising: depositing from a water slurry onto inorganic fibers a binder therefor consisting essentially of the product obtained from reacting phenol and formaldehyde in the presence of a finely divided precipitated phosphate fireproofing agent selected from the group consisting of monocalcium phosphate, tri-aluminum phosphate, magnesium ammonium phosphate, and mixtures thereof, and curing said resin on said fibers in the presence of said phosphate fireproofing agent.

2. In a method of producing fire-resistant insulation, the steps comprising: depositing from a water slurry onto inorganic fibers a binder therefor consisting essentially of the product obtained from reacting phenol and formaldehyde in the presence of finely divided precipitated monocalcium phosphate and curing said resin on said fibers in the presence of said monocalcium phosphate.

3. In a method of producing fire-resistant insulation, the steps comprising: depositing from a water slurry onto mineral fibers a binder therefor consisting essentially of the product obtained from reacting phenol and formaldehyde in the presence of a finely divided precipitated phosphate fireproofing agent selected from the group consisting of monocalcium phosphate, tri-aluminum phosphate, magnesium ammonium phosphate, and mixtures thereof, heating said binder-coated fibers to remove water therefrom, and thereafter curing said resin on said fibers in the presence of said phosphate fireproofing agent at a temperature above about 280° F.

4. In a method of producing fire-resistant insulation, the steps comprising: depositing from a water slurry onto mineral fibers a binder therefor consisting essentially of the product obtained from reacting phenol and formaldehyde in the presence of a finely divided precipitated phosphate fireproofing agent selected from the group consisting of monocalcium phosphate, tri-aluminum phosphate, magnesium ammonium phosphate, and mixtures thereof, heating said binder-coated fibers to remove water therefrom, and thereafter curing said resin on said fibers in the presence of said phosphate fireproofing agent at a temperature above about 325° F.

5. In a method of producing fire-resistant insulation, the steps comprising: depositing from a water slurry onto inorganic fibers a binder therefor consisting essentially of the product obtained from reacting phenol and formaldehyde in the presence of finely divided precipitated tri-aluminum phosphate and curing said resin on said fibers in the presence of said tri-aluminum phosphate.

6. In a method of producing fire-resistant insulation, the steps comprising: depositing from a water slurry onto inorganic fibers a binder therefor consisting essentially of the product obtained from reacting phenol and formaldehyde in the presence of finely divided precipitated magnesium ammonium phosphate and curing said resin on said fibers in the presence of said magnesium ammonium phosphate.

7. In a method of producing fire-resistant insulation, the steps comprising: reacting phenol with an excess of formaldehyde in the presence of 15% to 40% based on the weight of the phenol and formaldehyde of a finely divided precipitated phosphate fireproofing agent selected from the group consisting of monocalcium phosphate, tri-aluminum phosphate, magnesium ammonium phosphate, and mixtures thereof to form a fire-resistant binder product which is hard and brittle at temperatures of 70° F. to 80° F., grinding said binder product into a powder, dispersing said powder in a water slurry with inorganic fibers to be bonded with at least 5 parts of said powder to 100 parts of said fiber being present in said slurry, depositing said powder from said slurry onto said inorganic fibers, forming said slurry into a product of desired shape, drying the resulting product, and heating said product to cure said resin on said inorganic fibers in the presence of said phosphate fireproofing agent to bind the fibers with a fire-resistant binder.

References Cited in the file of this patent

UNITED STATES PATENTS

| Number | Name | Date |
|---|---|---|
| 1,310,841 | Robinson | July 22, 1910 |
| 1,160,362 | Baekeland | Nov. 16, 1915 |
| 1,577,890 | Abraham | Mar. 23, 1926 |
| 2,222,198 | Fleck | Nov. 19, 1940 |
| 2,250,483 | Hopkinson | July 29, 1941 |

(Other references on following page)

UNITED STATES PATENTS

| Number | Name | Date |
|---|---|---|
| 2,338,602 | Schur | Jan. 4, 1944 |
| 2,378,714 | Leatherman | June 19, 1945 |
| 2,378,715 | Leatherman | June 19, 1945 |
| 2,422,730 | Hoffman | June 24, 1947 |
| 2,439,667 | Mathes | Apr. 13, 1948 |
| 2,444,347 | Greger | June 29, 1948 |
| 2,481,486 | Abbott | Sept. 13, 1949 |
| 2,504,744 | Sproul et al. | Apr. 18, 1950 |

OTHER REFERENCES

Maxwell: Paper Trade J., May 13, 1943, p. 41.

Flame Proofing of Textiles, by Little, published by Reinhold Publishing Corp., New York (1947), pp. 227, 232.

Handbook of Chemistry and Physics, 28th ed. pp. 283, 287 and 296 (1944), published by Chemical Rubber Pub. Co., Cleveland, Ohio.

Hackh's Chemical Dictionary, 2d ed., p. 443 (1937), published by Blakiston's Son & Co., Inc., Philadelphia (publications in Science Library).